Oct. 16, 1962     R. JACOBI ETAL     3,059,051
OPTICAL FILTERS
Filed Aug. 22, 1957     2 Sheets-Sheet 1
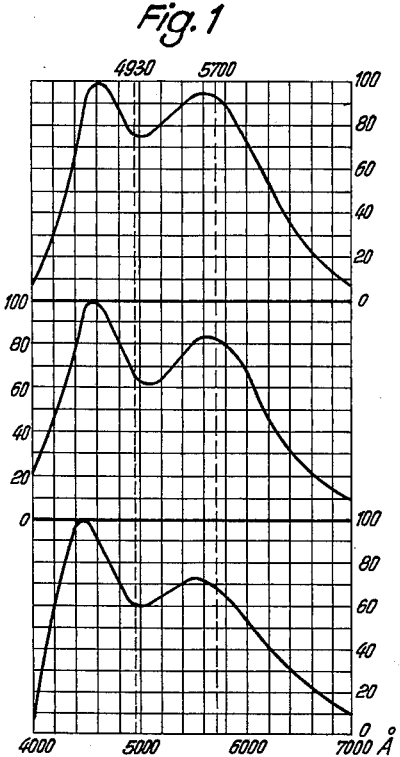
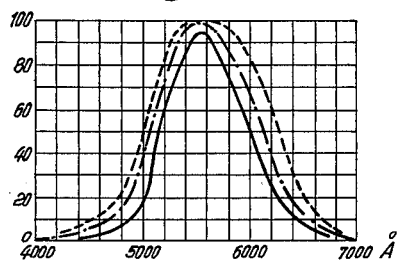
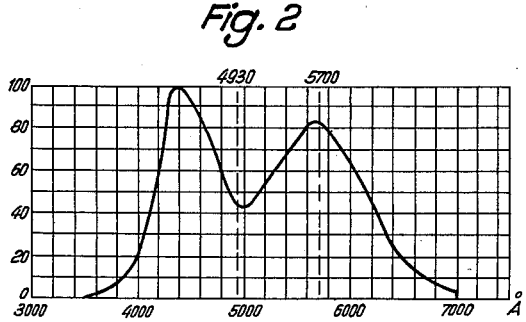
Inventors:
Richard Jacobi
Kurt Bückling
by Singer, Stern & Carlburg
Attorneys.

Oct. 16, 1962 R. JACOBI ETAL 3,059,051
OPTICAL FILTERS
Filed Aug. 22, 1957 2 Sheets-Sheet 2

Inventors:
Richard Jacobi
Kurt Beckling
by Singer, Stern & Carlburg
Attorneys.

United States Patent Office 3,059,051
Patented Oct. 16, 1962

3,059,051
OPTICAL FILTERS
Richard Jacobi and Kurt Boeckling, Unterkoblitz, Germany, assignors to Deutsche Tafelglas Aktiengesellschaft Detag, Furth, Bavaria, a German corporation
Filed Aug. 22, 1957, Ser. No. 679,592
Claims priority, application Germany Feb. 16, 1957
4 Claims. (Cl. 178—7.85)

This invention is concerned with improvements in or relating to optical filters and especially to optical filters for use with television sets for producing black and white images.

The usual television tubes of this type are provided with a screen whose fluorescent materials have emission maxima in the region of 5700–5900 A. and 4300–4500 A. An almost optical grey results by additive mixing of the light of both wave regions. For the reduction of the disturbing effect of the external light it is known to arrange a filter in front of the television tubes whose transparency agrees substantially with the emission of the light screen of the tube so that the emission curve of the light screen and the transparency curve of the filter run substantially parallel to one another. In this way, for the further intensification of the contrast effect, the transparency minimum of the filter, which lies between the two transparency maxima, can be made still sharper than the emission minimum between the two emission maxima of the light screen. Furthermore, it is known to influence the tint of the picture in a desired direction, e.g. for the achievement of a chamois-like tint, by slight displacement of the maxima of the light screen against the transparency maxima of the filter.

The achieved filtering of comparatively narrow spectral regions in the neighbourhood of the maxima by the combined effect of the light screen and filter curtain renders possible an exact grey compensation but, on the other hand, gives rise to an exceptionally strong loss of brightness which, in the smaller tubes, can be compensated again by the readjustment of the tube brightness. In the recently employed larger picture tubes, the available brightness reserve is not so large as in the small picture tubes so that the brightness of the picture is reduced in a troublesome manner by the use of a filter.

This fundamental shortcoming of the filters, which especially appears where the brightness reserves of the tubes are not strong enough, is avoided in the filters provided according to the invention in that the filter has a transparency maximum in the region of the highest spectral sensitivity of the eye (i.e. between about 5400 A. to 5800 A.) whereas the filter exhibits no transparency or only a comparatively small transparency, in the region of the emission maximum of the screen lying in the blue-violet wave band.

It has been shown that the emission maximum of the screen only has a subordinate influence on the brightness of the screen picture in the blue-violet spectral region since the sensitivity of the eye can be completely neglected in comparison to the maximal spectral sensitivity in the wavelength region of 5705–5724 A. The purpose of this hitherto provided emission maximum lying in the blue-violet lies in the grey compensation of the light screen picture of the second emission maximum lying in the yellow spectral region. As extensive investigations have shown, many people possess no sensitivity at all in the spectral region of 4400 A. in which one of the maxima of the light screen lies so that it is not necessary to adapt the filter to this maximum. Therefore, according to the invention, the transparency curve of the filter approximates substantially to the sensitivity characteristics of the eye. Thus, it is no longer necessary to keep small the band width of the emission spectrum lying in the yellow region, whereby a large loss of brightness results. On the contrary, the filter can be chosen without regard to the second emission spectrum lying in the blue-violet region, whereby a considerably higher absolute light transparency results in the range of maximal sensitivity of the eye. A fairly wide range of transparency lying in the region of the maximal eye sensitivity can now be given to the filter so that a fraction of the light absorbed by the known filters is not let through. Since this region of transparency extends over the whole rage of the maximal eye sensitivity, the light screen picture is visible through the filter almost without loss of brightness whereas the grey compensation is already brought about by the complementary wave regions let through in this region of transparency.

In order to give the filter a transparency characteristic which corresponds to the spectral course of the eye sensitivity, two complementary colouring materials with high yellow transparency, e.g. a green and a red colouring material, can be used, as is explained below with reference to the figures.

An improvement of the grey compensation of the filter is, according to the invention, preferably achieved by an enhanced transparency in the spectral region of 4910–4930 A. A faultless grey compensation is carried out by this spectral region which, according to present knowledge, is complementary for practically the whole orange-red region of the visible light, especially as it still lies within the region of a considerable eye sensitivity. This is inconsiderable so far as a chamois-coloured yellow tint is not grey compensated since such a tint is already intentionally produced by the use of special filters because, according to experience, it is preferred to the grey or the grey-blue tints which have been felt to be too cold. Thus, the grey compensation in the filter according to the invention, in contradistinction to the known filters, does not result with light in the wavelength region of 4400–4600 A., which from the point of view of intensity is completely ineffectual, but with the light of a wavelength region (4930 A.) which still lies in the region of the sensitivity maximum of the eye by which the brightness conditions can still be improved.

In order to achieve a transparency maximum in the region of the wavelength of 4910–4940 A., the choice of the green and red filter colouring materials used, which are complementary to one another, is affected in such a manner that these colouring materials of the necessary, high yellow transparency have a maximum in the named wave regions serving for the grey compensation. The filters which fulfill the last-mentioned requirements have, in contradistinction to the selective discs, hitherto used with television tubes, with a transparency maximum at 4500–4700 A. and a minimum between 4900 and 5700 A., the further advantage that their colour effect is scarcely dependent upon the influence of the external light. Whereas the known selective filters appear reddish in the early morning hours, grey by normal daylight and green by electric lamp light, the tint in the filters according to the invention, which have a transparency maximum between approximately 4930 A. and 5700 A., remains grey under the most varied lighting conditions. As a result of the exceptionally wide region of complementary tints which can be compensated in a narrow wave region in the neighbourhood 4930 A., the independence of the grey compensation from changing external light influences can be absolutely ensured whereby a considerable advantage in use results.

According to the invention there is provided an optical filter for increasing the contrast of television tubes, whereby the emission spectrum of the screen of the television tube exhibits a maximum in the blue-violet and another maximum in the yellow spectral region, characterised in that for the achievement of the smallest possible suppression of brightness the filter has a transparency maximum in the region of the highest spectral sensitivity of the eye (i.e. at about 5600 A.) while exhibiting no, or only a comparatively small, transparency in the region of the emission maximum lying in the blue-violet wave band.

For a better understanding of the invention reference will be made to the accompanying drawings, in which:

FIGURE 1 illustrates three different diagrams of the emission characteristics of light screens which are on the market in Germany;

FIGURE 2 is an emission characteristic of a light screen used in the U.S.A.;

FIGURE 3 illustrates the spectral sensitivity curve of the eye;

As can be seen from FIGURE 1, one of the emission maxima of the screens of German television tubes lies in the neighbourhood of 5700 A., thus in the maximal sensitivity region of the eye. A somewhat stronger emission maximum lies in the neighbourhood of 4400 A. while there is an emission minimum between these two maxima again lying in approximately the same wave length in the three television screens drawn upon for comparison. The ordinate units are related to the highest maximum of the emission whereby the number 100 is placed as the relative emission strength for the highest emission value.

The FIGURE 2, which shows the characteristics of the screen of an American television tube, gives substantially the same picture of the spectral emission. Nevertheless, the emission minimum at 4930 A. is more clearly defined than in the television screens according to FIGURE 1.

In FIGURE 3, three different spectral sensitivity curves of the eye are shown which were obtained from three different test persons. As can be seen from these curves, the sensitivity of the eye in the neighbourhood of 4400 A. is very small or, in individual test persons, no longer present, so that in the place in which the present television screens have their most strongly marked emission maximum, the human eye is scarcely sensitive or even insensitive to light.

Figure 4:
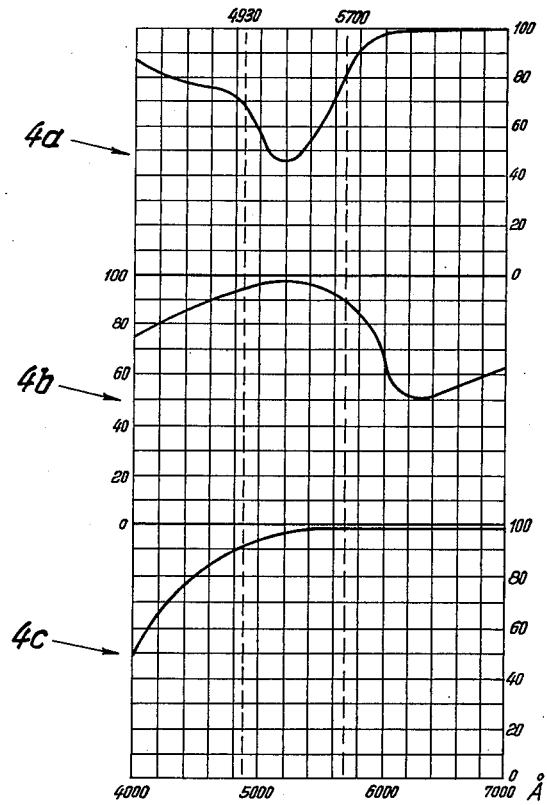
FIGURE 4 illustrates the selective absorption of three colouring materials with which is made up a filter according to the invention.
Figure 5:
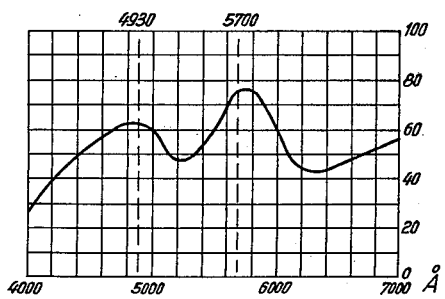
FIGURE 5 is the spectral sensitivity of a filter put together from the colouring materials according to FIGURE 4.

For the lowering of the extraneous light effects, the transparency curve of the filter is now, according to the invention, approximated to the course of sensitivity of the eye. In order to obtain a curve on both sides of the maximum of the filter transparency corresponding to the sensitivity characteristics of the eye, red and green colouring materials can, for example, be used as complementary colours, the additive transparency characteristics of which influence the course of the curve of the filter in a suitable manner. In FIGURE 4a, the characteristic of a red colouring material is given which exhibits a relatively high yellow transparency and a strong falling off of the transparency in the green region. The green colouring material employed (FIGURE 4b) shows a maximum transparency in the yellow region, whereas it has a strong falling off of transparency in the red—or orange—coloured wave regions. Finally, in FIGURE 4c, is given the course of the transparency of the yellow colouring material dependent on the wavelength. By simultaneous use of the colouring materials represented in FIGURE 4 by their transparency, a transparency maximum is obtained at 5700 A. and another, smaller transparency maximum at 4930 A. which guarantees a sufficient grey compensation of the reddish wavelengths of the light.

Since the light transparency on both the sides of the yellow maximum can be reduced to about 50%, this means that the disturbing external light is reduced in this region by altogether 75% as a result of the doubled light path. The suppression of the yellow transparency, which only amounts to about 25%, can be regarded as very small since even an ordinary safety-glass plate suppresses the light passing through by 15%, while the usual double vitrification with plain glass also causes a suppression of 25% which, however, is scarcely visible to the viewer.

*Example*

The following colouring materials are dissolved in 1 kg. of a solution consisting of 2 parts by weight of polyvinyl butyraldehyde and 1 part by weight of dibutyl phthalate:

0.6 gm. of a colouring material sold by the Badische Anilin- und Sodafabrik A.G. under the name "Encelack green G." The colouring material is a phthalocyanine dye-stuff obtained by distribution of 30 gm. heliogengreen in 44 parts colloidion wool and 26 parts dibutyl phthalate.

0.5 gm. of a colouring material sold by Farbenfabriken Bayer under the name "Ceresrot BB," which is o-aminoazotoluolazo-$\beta$-naphthol.

0.5 gm. of an azo-colouring material sold by Farbwerken Hoechst under the order number "831026 Fettgelb 3G" the chemical composition of which is identified as phenyl-azo-1-phenyl-3-methyl-pyrazolon-5.

The solution is poured onto a glass plate to form a thin film and united in the usual way with a second glass plate to give safety glass.

The colouring materials are compatible with one another and can thus be embedded together in the intermediate layer of a compound safety glass. They have a sufficient light stability and withstand without difficulty the working temperatures arising in the production of compound safety glass. The transparency curves of the three named colouring materials are shown in FIGURE 4 of the application.

Instead of the specified colouring materials, other light stable colouring materials can also be employed under the specified conditions which have the absorption curves shown in FIGURE 4.

We claim:

1. In combination, a television tube for producing black and white images, means whereby the emission spectrum of the screen exhibits a maximum in the blue-violet spectral region (i.e. at about 4400 A.) and another one in the yellow spectral region (i.e. at about 5700 A.), and an optical filter for increasing the image contrast; said filter comprising a sheet of transparent material interposed in the normal path of viewing of said screen and having substantially uniformly distributed coloring, means whereby said filter has a first transparency maximum in the region of the highest spectral sensitivity of the eye (i.e. at about 5600 A.), a comparatively small transparency in the region of the emission maximum lying in the blue-violet spectral region (i.e. at about 4400 A.), and a second transparency maximum substantially lower than said first maximum, said second maximum lying in the spectral region 4910–4939 A.

2. In combination, a television tube for producing black and white images, means whereby the emission spectrum of the screen exhibits a maximum in the blue-violet spectral region (i.e. at about 4400 A.) and another one in the yellow spectral region (i.e. at about 5700 A.), and an optical filter for increasing the image contrast; said filter comprising a sheet of transparent material interposed in the normal path of viewing of said screen and having substantially uniformly distributed coloring, means whereby said filter has a first transparency maximum in the region of the highest spectral sensitivity of the eye (i.e. at about 5600 A.), a comparatively small transparency in the region of the emission maximum lying in the blue-violet spectral region (i.e. at about 4400 A.), and a second transparency maximum substantially lower than said first maximum, said second maximum lying in the spectral region 4910–4939 A. and a high transparency in the orange red region being complementary to said second maximum.

3. In combination, a television tube for producing black and white images, means whereby the emission spectrum of the screen exhibits a maximum in the blue-violet spectral region (i.e. at about 4400 A.) and another one in the yellow spectral region (i.e. at about 5700 A.) and an optical filter for increasing the image contrast, said filter comprising a first sheet of transparent material, a second sheet of transparent material superimposed over and united to said first sheet of transparent material, and a light stable film of coloring materials in solution interposed between said first and second sheet of transparent material and means whereby said filter has a first transparency maximum in the region of the highest spectral sensitivity of the eye (i.e. at about 5600 A.), a comparatively small transaprency in the region of the emission maximum lying in the blue-violet spectral region (i.e. at about 4400 A.), and a second transparency maximum substantially lower than said first maximum, said second maximum lying in the spectral region 4910–4939 A.

4. In combination, a television tube for producing black and white images, means whereby the emission spetrum of the screen exhibits a maximum in the blue-violet spectral region (i.e. at about 4400 A.) and another one in the yellow spectral region (i.e. at about 5700 A.), and an optical filter for increasing the image contrast, said filter comprising a first sheet of transparent material, a second sheet of transparent material superimposed over and united to said first sheet of transparent material, and a light stable film of coloring materials in solution interposed between said first and second sheet of transparent material and means whereby said filter has a first transparency maximum in the region of the highest spectral sensitivity of the eye (i.e. at about 5600 A.), a comparatively small transparency in the region of the emission maximum lying in the blue-violet spectral region (i.e. at about 4400 A.), and a second transparency maximum substantially lower than said first maximum, said second maximum lying in the spectral region 4910–4939 A. and a high transparency in the orange red region being complementary to said second maximum.

References Cited in the file of this patent
UNITED STATES PATENTS

| | | |
|---|---|---|
| 2,420,168 | Dimmick | May 6, 1947 |
| 2,461,464 | Aronstein | Feb. 8, 1949 |
| 2,476,619 | Nicoll | July 19, 1949 |
| 2,644,854 | Sziklai | July 7, 1953 |
| 2,690,554 | Wolf | Sept. 28, 1953 |
| 3,009,017 | Conner et al. | Nov. 14, 1961 |

FOREIGN PATENTS

| | | |
|---|---|---|
| 426,789 | Great Britain | Apr. 5, 1935 |